United States Patent [19]

Osterman

[11] 4,410,071

[45] Oct. 18, 1983

[54] VEHICLE TRANSMISSION

[76] Inventor: Daniel R. Osterman, 8238 Honey Tree, Canton, Mich. 48187

[21] Appl. No.: 231,668

[22] Filed: Feb. 5, 1981

[51] Int. Cl.³ .................. B60K 25/00; B60K 41/28
[52] U.S. Cl. ............................... 192/2; 74/6;
 74/661; 180/65 A; 192/0.09; 192/48.92
[58] Field of Search ............ 192/2, 0.09, 48.92;
 74/6, 847, 661; 60/698, 706; 180/65.2, 69.6;
 123/179 E

[56] References Cited

U.S. PATENT DOCUMENTS

| | | | |
|---|---|---|---|
| 799,851 | 9/1905 | Hood | 74/6 X |
| 1,064,089 | 6/1913 | Rayner | 180/65.2 |
| 1,671,033 | 5/1928 | Kimura | 180/65.2 |
| 2,676,496 | 4/1954 | Gilbert | 74/661 |
| 2,912,875 | 11/1959 | Berthiez | 74/472 |
| 3,503,278 | 3/1970 | Livezey | 74/661 |
| 3,799,284 | 3/1974 | Hender | 180/65 |
| 4,054,181 | 10/1977 | Grosseau | 180/77 |
| 4,351,405 | 9/1982 | Fields et al. | 180/65.2 |

FOREIGN PATENT DOCUMENTS 2611384 9/1977 Fed. Rep. of Germany ..... 180/65.2

Primary Examiner—Rodney H. Bonck
Attorney, Agent, or Firm—Gifford, Van Ophem, Sheridan & Sprinkle

[57] ABSTRACT

A novel transmission is provided for use with a vehicle having a drive train and an engine with a rotary drive output shaft. The transmission comprises a housing having a driven member rotatably mounted to the housing and the driven member is coupled to the engine drive shaft. A drive member is also rotatably mounted to the transmission housing and is adapted for connection to the vehicle drive train so that rotation of the drive member in one direction propels the vehicle forwardly while the opposite rotation of the drive member propels the vehicle in reverse. A plurality of coupling members including at least one annulus are contained within the housing and selectively couple the driven member to the drive member in different gearing ratios in order to propel the vehicle. In addition, the annulus is driven by the engine in a predetermined direction of rotation. An electric motor is selectively coupled to the annulus to rotatably drive the annulus in the opposite direction and thereby propel the vehicle rearwardly.

9 Claims, 2 Drawing Figures

VEHICLE TRANSMISSION

BACKGROUND OF THE INVENTION

I. Field of the Invention

The present invention relates generally to transmissions and, more particularly, to a transmission for a vehicle such as a car or the like.

II. Description of the Prior Art

The previously known transmissions of the type used on cars, small trucks and the like, typically comprise a housing having a driven member which is coupled to and rotates in unison with the drive shaft from the engine. Similarly, these previously known transmissions include a drive member which is coupled to the drive train for the vehicle so that rotation of the drive member in one direction propels the car forwardly while the rotation of the drive member in the opposite direction propels the vehicle rearwardly. Conversely, the driven member rotates in a single and predetermined direction of rotation since it is coupled to the drive shaft from the engine.

These previously known vehicle transmissions are classified as either manual or automatic transmissions. In either case, however, a plurality of coupling members are provided within the transmission housing for drivingly connecting the transmission driven member to its drive member and thus for connecting the engine drive shaft to the vehicle drive train. In a manual transmission, the gear ratio between the transmission driven and drive members is controlled by the actuation of a gear shaft lever by the driver. In an automatic transmission, however, a hydraulic fluid is selectively provided to one or more fluid couplings and/or fluid brakes within the transmission housing to connect the driven member to drive member in different gear ratios.

A common automatic transmission employed in automotive vehicles is known as a single planetary, three speed transmission. This previously known automatic transmission uses three fluid couplings and two fluid brakes which are selectively actuated to produce three different gearing ratios between the transmission driven and drive members. The selection of the gearing ratio is carried out automatically by the transmission in dependence upon the engine speed and load conditions.

In order to obtain the reverse direction in an automatic transmission, however, it is necessary to add a plurality of additional coupling members to the automatic transmission. These additional coupling members not only significantly increase the overall cost of the automatic transmission and the weight of the transmission but also increase the axial length of the vehicle transmission. The additional axial length of the transmission is particularly disadvantageous in small or compact vehicles where the transmission length must be maintained at a minimum.

SUMMARY OF THE PRESENT INVENTION

The present invention overcomes the above mentioned disadvantages of the previously known transmissions by providing an automatic transmission in which the vehicle is driven in reverse by an electric motor.

In brief, the transmission according to the present invention comprises a housing having a driven member. A torque converter is coupled to and rotates in unison with the engine output drive shaft and the torque converter is interposed between the engine output drive shaft and the driven member. A drive member is rotatably mounted within the transmission housing and is adapted for connection with the vehicle drive train. Rotation of the drive member in one direction propels the vehicle forwardly while, conversely, rotation of the drive member in the opposite direction propels the vehicle rearwardly.

At least one and preferably several coupling members are provided between the drive and driven members for mechanically coupling the driven member to the drive member and thus propel the vehicle. The coupling members include at least one annulus which can be selectively coupled to the driven member and rotates in a predetermined direction of rotation as the vehicle is propelled forwardly. In a preferred form of the invention, this annulus includes a fly wheel of the type found in the previously known automatic transmissions. This fly wheel, furthermore, is coupled to the transmission driven member by a one-way clutch which engages when the fly wheel is driven in the direction of rotation of the engine drive shaft but disengages in the opposite direction.

The present invention further comprises a reversible electric motor having an output shaft with a gear wheel which can be selectively moved into driving engagement with the fly wheel.

In operation, when the electric motor is actuated so that it rotates in a first direction, the fly wheel is driven in the same direction of rotation as the engine drive shaft. Upon doing so, the clutch engages so that the motor and fly wheel are used to rotatably drive the engine drive shaft and to start the engine in the normal fashion.

Conversely, when the electric motor is actuated in the opposite direction of rotation, the fly wheel is likewise driven in the reverse direction whereupon the one-way clutch disengages. Simultaneously, the fly wheel rotatably drives the transmission drive member in the opposite direction of rotation and propels the vehicle rearwardly. Consequently, the transmission of the present invention provides a reverse gear for the transmission without the necessity of the previously known additional coupling member in order to obtain the reverse gear.

The electric motor is preferably a variable speed electric motor and, when the electric motor is used to propel the vehicle rearwardly, the speed of the electric motor is controlled by a pair of switches. One switch is operatively coupled to the throttle for the vehicle while the other switch is operatively coupled to the vehicle brake pedal. These switches are coupled to an electronic circuit which increases the speed of the electric motor upon depression of the throttle and, conversely, decreases the speed of the electric motor upon depression of the brake pedal. Thus, when the electric motor is used to propel the vehicle in reverse, the brake and throttle pedals function in the normal fashion to control the speed of the vehicle. A still further switch coupled to the transmission gear selector controls the direction of rotation of the electic motor so that the electric motor can be used both to start the vehicle engine or to propel the vehicle in reverse.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
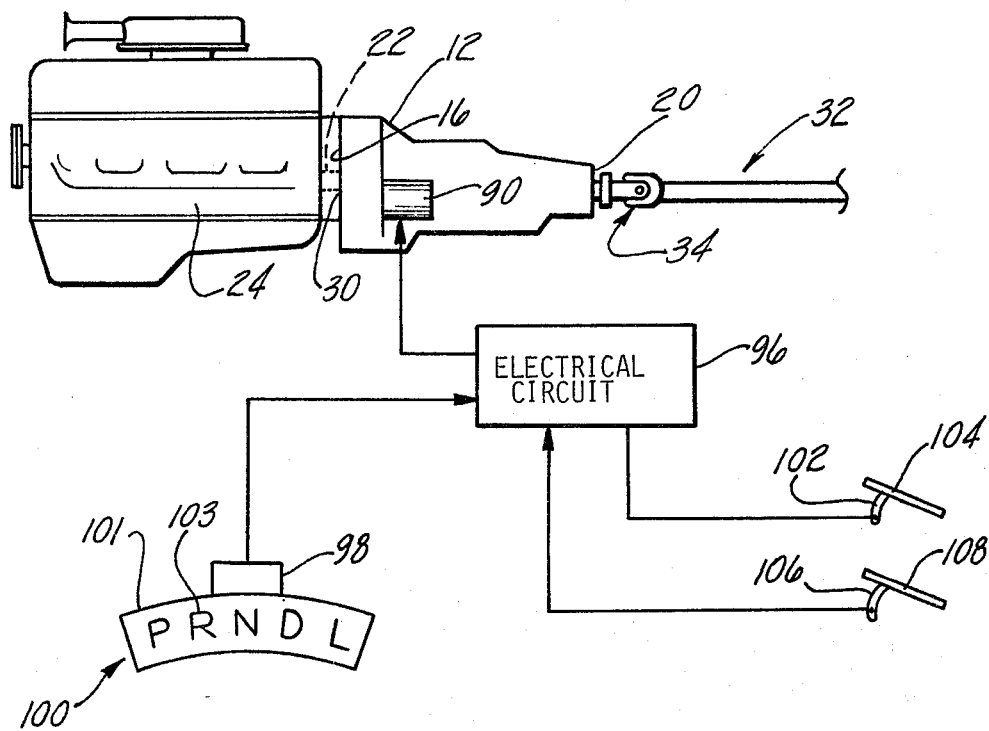
FIG. 1 is a diagrammatic view illustrating a preferred embodiment of the invention.

With reference to the drawing, a preferred embodiment of the transmission of the present invention is thereshown and comprises a housing 12 having a driven member 14 rotatably mounted to the housing and open at one end 16 of the housing 12. Similarly, a drive member 18 is rotatably mounted to the transmission housing 12 and is open to the opposite end 20 of the housing 12.

The transmission driven member 14 is adapted for connection with a drive shaft 22 from the vehicle engine 24 via a torque converter and pump 36 in the conventional fashion.

Similarly, the transmission drive member 18 is adapted for connection with a vehicle drive train 32 (illustrated only diagrammatically) by a universal joint 34 or similar means. Consequently, rotation of the transmission drive member 18 in one direction propels the vehicle forwardly while, conversely, rotation of the transmission drive member 18 in the opposite direction propels the vehicle in reverse.

Figure 2:
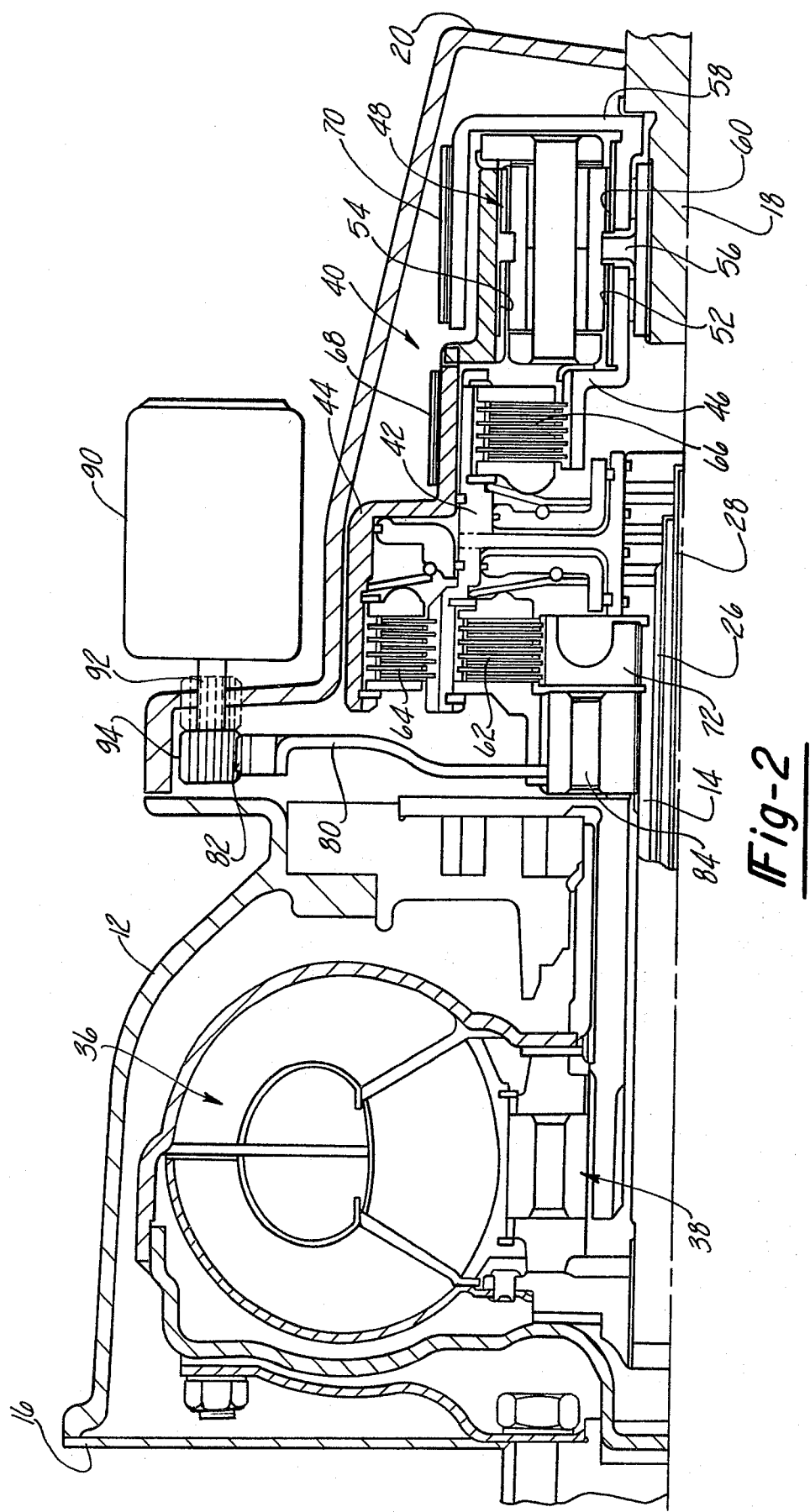
FIG. 2 is a fragmentary longitudinal sectional view of the preferred embodiment of the invention, and with parts removed for clarity.

With reference now particularly to FIG. 2, the preferred embodiment of the transmission of the present invention is thereshown in greater detail and includes a torque convertor and pump 36 interposed between the drive shaft 22 and driven member 14 in the conventional fashion. The torque convertor and pump 36 provides hydraulic fluid for the transmission in the conventional fashion so that further description thereof is unnecessary.

Still referring to FIG. 2, a plurality of coupling members 40 are contained within the transmission housing and, as will become shortly apparent, selectively drivingly connect the transmission driven member 14 to the drive member 18 in order to propel the vehicle. As shown in the drawing, these coupling members include a first annulus 42 rotatably mounted within the transmission housing 12 coaxially with the driven member 14 and an outer annulus 44 disposed coaxially around the first annulus 42. An inner annulus 46 is also rotatably mounted within the transmission housing 12 coaxially around the transmission drive member 18 while a planetary gear 48 is disposed in between the outer annulus 44 and inner annulus 46 adjacent the rear end 20 of the transmission housing 12.

The inner annulus 46 includes a gear rack 52 which meshes with the planetary gear 48 while, similarly, the outer annulus 44 includes a gear rack 54 which meshes with the planetary gear 48. A gear wheel 56 is secured to the transmission drive member 18 and meshes with the planetary gear 48 so that rotation of the planetary gear 48, either around its own axis or around the axis of the transmission drive member 18, rotatably drives the drive member 18. The coupling member 40 also includes a brake member 58 having a gear rack 60 which meshes with the planetary gear 48.

The transmission of the present invention further comprises fluid couplings 62, 64 and 66 as well as fluid brakes 68 and 70 to drivingly connect the transmission driven member 14 to the drive member 18 in different gear ratios. The torque converter and pump 36 provide hydraulic fluid to these couplings 62–66 and brakes 68 and 70 in the conventional fashion. Furthermore, in the preferred form of the invention, each fluid coupling 62, 64 and 66 comprises a plurality of alternating, spaced and parallel drive and driven plates. As hydraulic fluid is pumped into the coupling, torque is transmitted from the drive plates and to the driven plates thus achieving the desired driving connection for the fluid coupling.

The drive plates for the fluid coupling 62 are attached to the transmission driven member 14 by a mounting piece 72 so that the drive plates for the coupling 62 rotate in unison with the transmission driven member 14. The driven plates for the coupling 62 are attached to the first annulus 42 so that, with the coupling 62 engaged, the first annulus 42 rotates in a first direction which is the same as the direction of rotation of the transmission driven member 14.

Similarly, the fluid coupling 64 is operatively disposed between the first annulus 42 and the outer annulus 44. Consequently, with the second coupling 64 engaged, the outer annulus 44 rotates in the same direction of rotation as the first annulus 42. Similarly, the final fluid coupling 66 is operatively disposed between the first annulus 42 and the inner annulus 46. With the fluid coupling 66 engaged, the inner annulus 46 rotates in the same direction as the first annulus 42.

The fluid brakes 68 and 70 are of conventional construction so that a description of their operation is unnecessary. In brief, however, the fluid brake 68, when actuated, serves to stop the rotation of the outer annulus 44 while the brake 70, when actuated, stops the rotation of the brake member 58.

The various fluid couplings 62–66 and fluid brakes 68 and 70 are selectively actuated to change the gearing ratio from the transmission driven member 14 and to its drive member 18. For example, in the first or lowest gear, the couplings 62 and 66 are actuated as well as the fluid brake 68. Similarly, for the second or next lowest gear ratio, the fluid couplings 62 and 64 as well as the brake 70 are actuated. Lastly, for third gear, the fluid coupling 62, 64 and 66 are all actuated and neither of the brakes 68 or 70 are actuated.

As thus far described, the transmission of the present invention is of conventional construction. Unlike the previously known transmissions, however, the transmission of the present invention further comprises a fly wheel 80 which is attached to the first annulus 42 in any conventional fashion and rotates in unison with the first annulus 42. The fly wheel 80 further has an outer gear ring 82 and is coaxial with the transmission driven member 14. The fly wheel 80 is mounted to the transmission driven member 14 by a one-way clutch 84 which engages when the fly wheel 80 is driven in the same direction of rotation as the driven member 14 with respect to the driven member 14. Conversely, the one-way clutch 84 disengages when driven in the opposite direction. The one-way clutch 84 can be of any conventional construction.

With reference now to FIGS. 1 and 2, a reversible electric motor 90 having an output shaft 92 is mounted onto the exterior of the transmission housing 12. A pinion 94 is secured to the motor output shaft 92 and the motor shaft 92 with its pinion 94 is axially displacable between an extended position shown in solid line in FIG. 2 and a retracted position, shown in phantom line in FIG. 2. In its extended position, the motor pinion 94 meshes with ring gear 82 on the fly wheel 80.

Still referring to FIGS. 1 and 2, an electric circuit 96 is used to control both the direction of rotation of the motor 90 as well as its speed. A direction control switch 98 is operatively coupled with a gear selector 100 for the vehicle and is used to control the direction of rotation of the motor 90. More specifically, with the gear selector in a neutral position 101 (such as "Park"), the motor 90, upon actuation, rotatably drives the fly wheel 80 in the same direction of rotation as the transmission input member 14. Conversely, with the gear shift selector 100 in the "Reverse" position 103, the direction of rotation of the motor 90 is reversed.

A rheostat 102 is connected to a throttle pedal 104 of the engine and also provides an input signal to the electric circuit 96 which varies proportionately with the depression of the throttle 104. Similarly, a second rheostat 106 is operatively connected with the vehicle brake pedals 108 and likewise provides an input signal 96 to the circuit 96 which varies proportionately with depression of the brake pedal 108.

The rheostats 102 and 106 are used to control the speed of the motor 90 when the gear selector 100 is in its reverse position 103. In particular, with the gear selector 100 in the reverse position 103, the depression of the throttle pedal 104 varies the rheostat 102 and increases the speed of the electric motor 90 proportionately with the depression of the throttle pedal 104. Conversely, the depression of the brake pedal 108 varies the value of the rheostat 106 and decelerates the motor 90 by an amount proportional to the depression of the brake pedal 108. A sufficient depression of the brake pedal 108, moreover, is sufficient to temporarily deactivate the motor 90.

In operation, assuming that the vehicle gear selector 100 is in the neutral position 101, the activation of the electric motor 90 by the ignition key rotatably drives the fly wheel 80 in the same direction as the transmission driven member 14. The one-way clutch 84 simultaneously engages so that the electric motor 90 is used to rotatably drive the engine drive shaft 22 through the torque converter and pump 36 and start the engine in the conventional fashion. After the vehicle engine 24 has started, the electric motor pinion 94 moves to its retracted position.

When it is desired to drive the vehicle in reverse, the vehicle gear selector 100 is moved to the reverse position thus reversing the direction of rotation of the electric motor 90. The subsequent depression of the vehicle throttle pedal 92 will simultaneously move the motor pinion 94 to its extended position and rotatably drive the fly wheel 80 in a direction opposite from the normal direction of rotation of the transmission driven member 14 so that the one-way clutch 84 becomes disengaged.

With the vehicle gear selector 100 in the reverse position, the fluid coupling 62 is disengaged and, simultaneously, the fluid coupling 66 and fluid brake 68 become engaged. Consequently, since the first annulus 42 is connected to the fly wheel 80, the first annulus 42 rotates in a direction opposite from its normal direction of rotation as well as the inner annulus 46 while the outer annulus 44 remains stationary. The rotation of the inner annulus 46 thus rotatably drives the planetary gear 48 in the reverse direction of rotation which likewise reverses the direction of rotation for the transmission output shaft 18. The drive train 32, of course, is also rotatably driven in the reverse direction thus propelling the vehicle rearwardly in the desired fashion. When the rearward movement of the vehicle is no longer desired, the depression of the brake pedal 108 will slow and ultimately deactivate the motor 90 thus stopping the vehicle.

From the foregoing, it can be seen that the present invention provides a novel transmission for a vehicle which employs an electric motor both as the starter motor for the vehicle engine and also to propel the vehicle rearwardly. As such, the present invention eliminates the previously known gearing works or coupling members necessary to produce rearward propulsion of the vehicle of the previously known transmission. The elimination of these coupling members advantageously eliminates both their cost, weight and also the additional axial length of the transmission housing necessary to accomodate these additional coupling members. Moreover, since the vehicle battery is continually recharged by the vehicle alternator or generator as long as the vehicle engine is operating, no additional fuel is required to drive the vehicle rearwardly, thus providing an energy savings.

Having described my invention, however, many modifications thereto will become apparent to those skilled in the art to which it pertains without deviation from the spirit of the invention as defined by the scope of the appended claims.

I claim:

1. For use with a vehicle having a drive train and an engine with a rotary drive shaft, a transmission comprising:

a housing, a driven member rotatably mounted in the housing and means for coupling said engine drive shaft to said driven member, a drive member rotatably mounted to said housing and adapted for connection with the vehicle drive train so that rotation of the transmission drive member in one direction propels the vehicle in a forward direction while rotation of the transmission drive member in the opposite direction propels the vehicle in a reverse direction, means for selectively coupling said driven member to said drive member whereby said engine drive shaft rotatably drives said drive member in said one direction, said coupling means comprising an annulus which rotates in a first direction to produce rotation of the drive member in said one direction, means for rotatably driving said annulus in a direction opposite from said first direction to thereby rotatably drive said drive member in said opposite direction, said means for rotatably driving said annulus in said opposite direction comprising an electric motor having an output, means for selectively actuating said motor in a predetermined direction of rotation, and means for drivingly connecting said motor output to said annulus, and a one-way clutch operatively disposed between said annulus and said driven member, said one-way clutch engaging when said annulus is driven in said first direction with respect to said driven member and means for actuating said electric motor in a rotational direction opposite from said predetermined direction.

2. The invention as defined in claim 1 wherein said vehicle includes a brake pedal and wherein said motor actuating means comprises deceleration switch means connected to said brake pedal for decreasing the rotational speed of said electric motor proportionately with the depression of the brake pedal.

3. The invention as defined in claim 1 wherein said vehicle includes a throttle and wherein said motor actuating means further comprises acceleration switch means connected to said throttle for increasing the rotational speed of said electric motor proportionately with the depression of the throttle.

4. The invention as defined in claim 2 wherein said vehicle includes a throttle and wherein said motor actuating means further comprises acceleration switch means connected to said throttle for increasing the rotational speed of said electric motor proportionately with the depression of the throttle.

5. The invention as defined in claim 1 wherein the vehicle includes gear shift means having a neutral position and a reverse position and wherein said invention further comprises direction switch means operatively coupled with said gear shift to limit the rotation of said electric motor to said predetermined direction when said gear shift means is in said reverse position and to limit the rotation of said electric motor in said direction opposite from said predetermined direction when said gear shift means is in said neutral position.

6. The invention as defined in claim 1 wherein said annulus comprises a fly wheel.

7. For use with a vehicle having a drive train and an engine with a rotary drive shaft, a transmission comprising:
a housing,
a driven member rotatably mounted in the housing and means for coupling said engine drive shaft to said driven member,
a drive member rotatably mounted to said housing and adapted for connection with the vehicle drive train so that rotation of the transmission drive member in one direction propels the vehicle in a forward direction while rotation of the transmission drive member in the opposite direction propels the vehicle in a reverse direction,
means for selectively coupling said driven member to said drive member whereby said engine drive shaft rotatably drives said drive member in said one direction, said coupling means comprising an annulus which rotates in a first direction to produce rotation of the drive member in said one direction,
means for rotatably driving said annulus in a direction opposite from said first direction to thereby rotatably drive said drive member in said opposite direction, said means for rotatably driving said annulus in said opposite direction comprising an electric motor having an output, means for selectively actuating said motor in a predetermined direction of rotation, and means for drivingly connecting said motor output to said annulus, and
wherein said vehicle includes a throttle and wherein said motor actuating means further comprises acceleration switch means connected to said throttle for increasing the rotational speed of said electric motor proportionately with the depression of the throttle.

8. The invention as defined in claim 7 wherein said vehicle includes a brake pedal and wherein said motor actuating means further comprises deceleration switch means connected to said brake pedal for decreasing the rotational speed of said electric motor proportionately with the depression of the brake pedal.

9. For use with a vehicle having a drive train and an engine with a rotary drive shaft, a transmission comprising:
a housing,
a driven member rotatably mounted in the housing and means for coupling said engine drive shaft to said driven member,
a driven member rotatably mounted to said housing and adapted for connection with the vehicle drive train so that rotation of the transmission drive member in one direction propels the vehicle in a forward direction while rotation of the transmission drive member in the opposite direction propels the vehicle in a reverse direction,
means for selectively coupling said driven member to said drive member whereby said engine drive shaft rotatably drives said drive member in said one direction, said coupling means comprising an annulus which rotates in a first direction to produce rotation of the drive member in said one direction,
means for rotatably driving said annulus in a direction opposite from said first direction to thereby rotatably drive said drive member in said opposite direction, said means for rotatably driving said annulus in said opposite direction comprising an electric motor having an output, means for selectively actuating said motor in a predetermined direction of rotation, and means for drivingly connecting said motor output to said annulus, and
wherein said vehicle includes a brake pedal and wherein said motor actuating means comprises deceleration switch means connected to said brake pedal for decreasing the rotational speed of said electric motor proportionately with the depression of the brake pedal.

* * * * *